United States Patent
Koizumi et al.

(10) Patent No.: US 6,259,470 B1
(45) Date of Patent: *Jul. 10, 2001

(54) IMAGE CAPTURE SYSTEM HAVING VIRTUAL CAMERA

(75) Inventors: David Koizumi; Daniel A. Teibel, both of Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,323

(22) Filed: Dec. 18, 1997

(51) Int. Cl.[7] .............................. H04N 7/14; H04N 13/02; H04N 15/00
(52) U.S. Cl. ...................... 348/14.1; 348/14.01; 348/47; 348/48
(58) Field of Search .................................. 348/12–15, 20, 348/47–48, 191, 739, 218, 571, 575, 576, 581; 382/298, 300; 379/202; 370/260; 709/204

(56) References Cited

U.S. PATENT DOCUMENTS

| | | | | |
|---|---|---|---|---|
| 5,040,005 | * | 8/1991 | Davidson et al. | 396/429 |
| 5,214,519 | * | 5/1993 | Faulhaber et al. | 358/451 |
| 5,276,515 | * | 1/1994 | Katsumata et al. | 348/704 |
| 5,359,362 | * | 10/1994 | Lewis et al. | 348/15 |
| 5,481,354 | * | 1/1996 | Nakajima | 399/371 |
| 5,500,671 | * | 3/1996 | Andersson et al. | 348/15 |
| 5,537,157 | * | 7/1996 | Washino et al. | 348/722 |
| 5,612,734 | * | 3/1997 | Nelson et al. | 348/20 |
| 5,666,155 | * | 9/1997 | Mersereau | 348/20 |
| 5,675,374 | * | 10/1997 | Khoda | 348/15 |
| 5,675,376 | * | 10/1997 | Andersson et al. | 348/20 |
| 5,696,650 | * | 12/1997 | Songer | 348/436 |
| 5,745,126 | | 4/1998 | Jain et al. | |
| 5,751,337 | * | 5/1998 | Allen et al. | 348/15 |
| 5,757,424 | * | 5/1998 | Frederick | 348/218 |
| 5,781,229 | | 7/1998 | Zediker et al. | |
| 5,815,197 | * | 9/1998 | Kakii | 348/20 |
| 5,844,544 | | 12/1998 | Kahn et al. | |
| 5,933,257 | * | 8/1999 | Kurita | 358/527 |
| 5,963,678 | * | 10/1999 | Nozawa | 382/299 |
| 5,966,116 | * | 10/1999 | Wakeland | 345/126 |

FOREIGN PATENT DOCUMENTS

PCT/US98/27024  12/1998 (WO).

OTHER PUBLICATIONS

Hayashi, Masaki, "Image Compositing Based on Virtual Cameras", NHK Science and Technical Research Laboratories, IEEE, pp. 36–48, 1998.*

Hayashi et al, "Desktop Virtual Studio System", IEEE Trans. on Broadcasting, vol. 42, No. 3, pp. 278–284, Sep. 1996.*

Terashima et al, "Virtual Space Teleconferencing System", 5th IEEE COMSOC International Workshop on Multimedia Communications, 1999.*

Cooperstock et al, "Turning Your Video Monitor into a Virtual Window", IEEE Pacific Rim Conference on Communications, Computers, and Signal Processings, 1995.*

(List continued on next page.)

Primary Examiner—Vu Le
(74) Attorney, Agent, or Firm—Blakely, Sokoloff, Taylor & Zafman LLP

(57) ABSTRACT

An improved image capture system capable of combining the individual images from at least two image capture devices to produce a virtual camera for simulated line-of-sight image capture in such computer-based image capture applications as video conferencing, video telephony, video messaging, video postcards, multimedia training, and/or multimedia authoring.

19 Claims, 8 Drawing Sheets

OTHER PUBLICATIONS

Sheppard et al, "Virtual Conferencing", IEE Colloquium on Teleconferencing Futures, Digest No. 1997/121.*

"Eye to Eye Contact for Desk to Desk Video Conferencing", IBM Technical Disclosure Bulletin, Jul. 1992, vol. 35, Issue No. 2, pp. 316–318.*

Masaki Hayashi, "Image Compositing Based on Virtual Cameras," NKH Science and Technical Research Laboratories, 1070–986X/98, IEEE, pp. 36–48.

M. Hayashi, K. Enami, H. Noguchi, K. Fukui, N. Yagi, S. Inoue, M. Shibata, Y. Yamanouchi, Y. Itoh," Desktop Virtual Studio System", IEEE Transactions on Broadcasting, vol. 42, No. 3, Sep. 1996, pp. 278–284.

* cited by examiner

IMAGE CAPTURE SYSTEM HAVING VIRTUAL CAMERA

BACKGROUND OF THE INVENTION

1. Field of the Invention

The present invention relates generally to the field of photographic and/or video image capture systems and, more particularly, to an improved image capture system capable of combining the individual images from at least two image capture devices to produce a virtual camera for simulated line-of-sight image capture.

2. Description of the Related Art

A fundamental challenge in photographic and/or video image capture is ensuring that the image capture device and subject are properly stationed to provide line-of-sight image capture. As used herein, the term "line-of-sight image capture" means capturing a photographic and/or video image while the subject is looking directly into the lens of the image capture device. Line-of-sight image capture is desirable in that the resulting photographic and/or video images show the subject looking outward toward a viewer for simulated face-to-face contact. If line-of-sight image capture is not performed, the subject has the appearance of staring off away from the viewer which, as will be appreciated, diminishes the intimacy associated with face-to-face contact.

Line-of-sight image capture involves two basic operations. First, the image capture device and the subject must be positioned such that the subject is disposed within the field of view of the image capture device. This may be accomplished by adjusting the position of the subject and/or image capture device while monitoring the position of the subject through the use of a viewfinder or preview window. Second, the subject must look directly into the lens of the image capture device during image capture. The end result is a photographic and/or video image which depicts the subject looking directly outward for simulated face-to-face contact with a viewer.

Line-of-sight image capture is not particularly difficult when endeavoring to capture the photographic and/or video image of another person. An operator can simply view the subject within the viewfinder, adjust the image capture device and/or the positioning of the subject to ensure that the subject is within the viewing angle of the lens, and then instruct the subject to look into the lens before activating the image capture device. Unique challenges exist, however, when the operator of the image capture device is desirous of capturing his or her own photographic and/or video image. For example, in the photographic context, it may be difficult for the operator to ensure that they are properly disposed within the viewing angle of the image capture device. The operator may attempt to take his or her own photographic image by holding a photographic image capture device at arms length and pointing it back at himself or herself. This may be problematic, however, in that the operator is incapable of previewing their own image because the viewfinder is located on the opposite side of the photographic image capture device.

This problem has been overcome in the video camcorder context with the advent of viewfinders that may be selectively positioned in the same direction as the lens to allow operators to view themselves while capturing their own video image. Notwithstanding this improvement, line-of-sight image capture is nonetheless difficult to perform because the operator must, by definition, look away from the lens of the image capture device in order to preview their image in the viewfinder. If the operator performs image capture while looking at the viewfinder, they will appear to be staring off away from a viewer. If the operator looks back to the lens prior to performing image capture, they run the risk of inadvertently moving the position of the lens such that the resulting images are not centered within the field of view.

Computer-based image capture systems suffer similar drawbacks in performing line-of-sight image capture. Computer-based image capture systems may include, for example, video conferencing systems, video telephony systems, video messaging systems, video postcard systems, multimedia training systems, and multimedia authoring systems. At a minimum, such systems include a display for visually communicating graphical and/or textual information to an operator, an image capture device for capturing the photographic and/or video image of the operator, and a computer processing unit for coordinating the operation of the overall system. The image capture device is disposed at a predetermined location about the periphery of the display such that the operator has an unobstructed view of the display.

The main obstacle in performing line-of-sight image capture in such computer-based image capture systems stems from the physical distance or offset between the image capture device and the display. More specifically, line-of-sight image capture in computer-based image capture systems can only be conducted at the expense of viewing the information on the display. This may be seen, for example, with reference to the prior art desktop video conferencing station 2 shown in FIG. 1. The video conferencing station 2 comprises a video display 4, an image capture device 6, and a personal computer 8. The image capture device 6 is disposed on top of the video display 4 to ensure that the local conferencee 10 has an unobstructed view of the information on the display 4. This necessarily produces a vertical offset between the image capture device 6 and the local conferencee 10 such that, when looking at the display 4 as at 12, the local conferencee 10 appears to be looking away from the image capture device 6 from the vantage of the remote conferencee. In order to establish face-to-face contact with the remote conferencee, the local conferencee 10 must look directly into the lens of the image capture device 6 as at 14. This disadvantageously restricts the local conferencee's 10 ability to view the information displayed on the display 4.

Although described above in the context of a video conferencing system, it is to be understood that this problem exists in every computer-based application where an operator wants to capture his or her own image. These applications may include, but are not necessarily limited to, video conferencing, video telephony, video messaging, video postcard, multimedia training, and multimedia authoring.

The present invention is directed at overcoming, or at least reducing the effects of, one or more of the problems set forth above.

SUMMARY OF THE INVENTION

In one aspect of the present invention, an apparatus is provided including display means, image capture means, and means for seamlessly combining images obtained from the image capture means. The display means is provided for displaying information to an operator. The image capture means is disposed proximate to the display means and provided for capturing a first and second image of the operator from first and second offset locations. The means for seamlessly combining the first and second images from the image capture means forms a virtual camera at a predetermined location on the display for simulating line-of-sight image capture of the operator.

In another aspect of the present invention, an apparatus for simulating line-of-sight image capture. The apparatus includes display means, image capture means, and image correlator means for combining the images obtained from the image capture means. The display means is provided for displaying information to an operator. The image capture means is disposed proximate to the display means and provided for capturing a first and second image of the conferencee from first and second offset locations. The image correlator means is provided for receiving and combining the first and second images of the operator to form a composite image depicting the operator looking substantially directly into a lens of an image capture device.

In a still further aspect of the present invention, a method is provided for simulating line-of-sight image capture within a computer-based image capture system. The method comprises the steps of: (a) capturing a first image of an object from a first predetermined location; (b) capturing a second image of the object from a second predetermined location; (c) combining the first and second images of the object to form a composite image depicting the object looking directly into a lens of an image capture device.

In yet another aspect of the present invention, an apparatus is provided for facilitating face-to-face communications between conferencees at remote locations. The apparatus includes at least two conferencing stations communicatively linked together. Each conferencing station includes display means, image capture means, and means for combining images from the image capture means. The display means is provided for displaying information to a conferencee. The image capture means is provided for capturing images of the conferencee from at least two different offset locations. The means for combining the images captured by the image capture means forms a virtual camera at a predetermined location on the display means for simulating face-to-face communication between conferencees at remote video conferencing locations.

In a still further aspect of the present invention, a method is provided for facilitating face-to-face communication between a first being and a second being. The method comprises the steps of: (a) capturing two images of a first being from offset points of view; (b) combining the images to form a composite image depicting the first being looking substantially directly into the lens of an image capture device; and (c) communicating the composite image of the first being to a second being.

BRIEF DESCRIPTION OF THE DRAWINGS

Other objects and advantages of the invention will become apparent upon reading the following detailed description and upon reference to the drawings in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
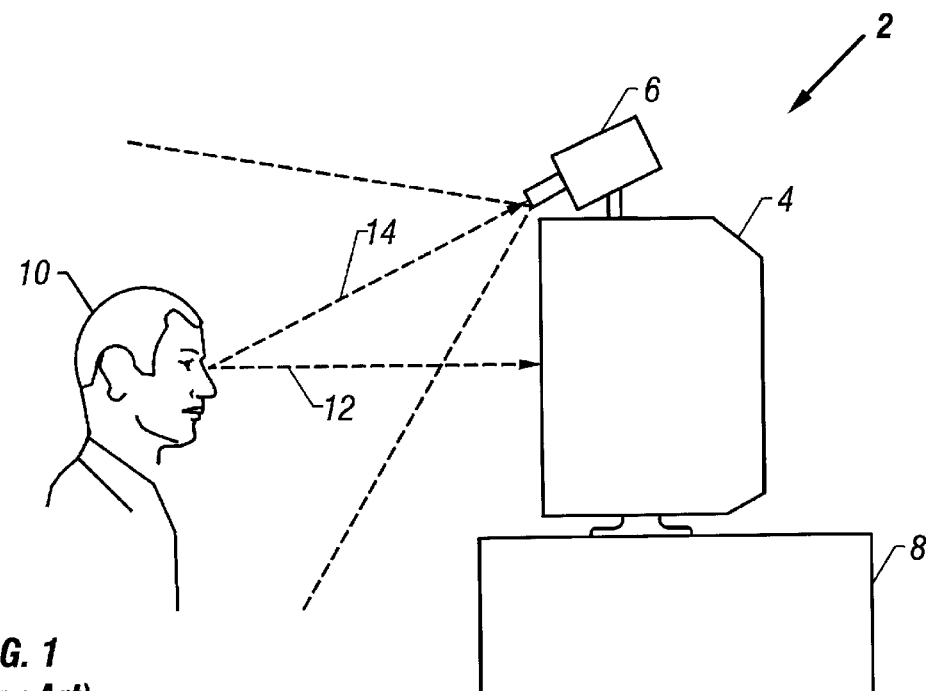
FIG. 1 is a side view of a video conferencing station of the prior art.
Figure 2:
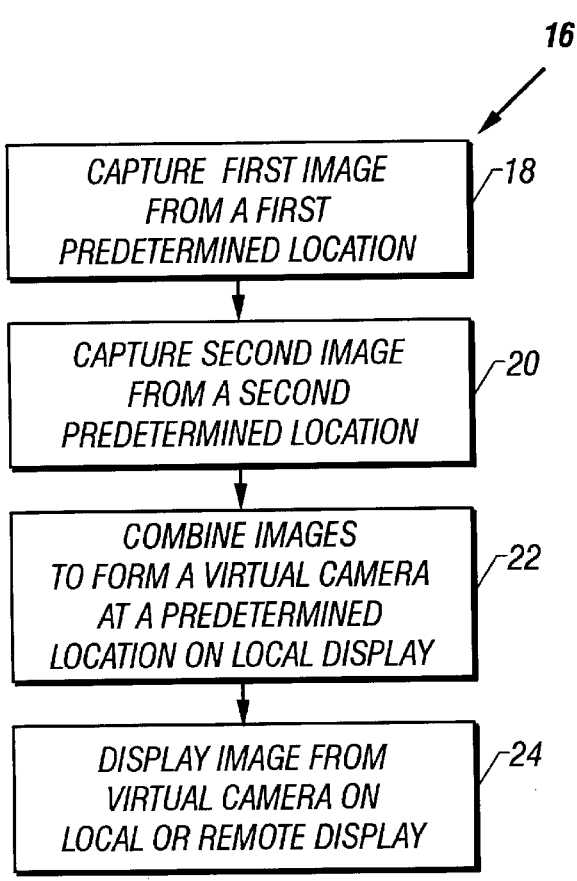
FIG. 2 is a flow chart illustrating a method of accomplishing line-of-sight image capture in a computer-based image capture system in accordance with the present invention.

With reference to FIG. 2, shown is a flow chart illustrating a method 16 of accomplishing line-of-sight image capture in a computer-based image capture system in accordance with the present invention. The line-of-sight image capture method 16 finds particular application in computer-based image capture systems where the operator wants to capture his or her own photographic and/or video image. By way of example, such computer-based image capture systems may include, but are not necessarily limited to, video conferencing systems, video telephony systems, video messaging systems, video postcard systems, multimedia training systems, and multimedia authoring systems.

The first step 18 involves capturing a first image of the operator from a first predetermined location about the periphery of the display of the computer-based image capture system. The second step 20 involves capturing a second image of the operator from a second predetermined location about the periphery of the display of the computer-based image capture system. In an important aspect of the present invention, steps 18 and 20 are accomplished by providing at least two image capture devices about the periphery of the display of the computer-based image capture system. Disposing the image capture devices about the periphery of the display is necessary to ensure that the operator has, at all times, an unobstructed view of the visual communication on the display. The image capture in steps 18 and 20 should preferably occur simultaneously so as to obtain images of the operator from at least two different perspectives at a particular point in time.

The images captured in steps 18 and 20 are then combined in step 22 to form a virtual camera at a predetermined location on the display of the computer-based image capture system. By this, it is meant that the individual images obtained in steps 18 and 20 are combined in such a fashion that the resulting composite image appears to have been obtained from a single image capture device having a lens disposed on the surface of the display pointing at the operator for line-of-sight image capture. This is referred to as a "virtual camera" because the desired line-of-sight image capture is simulated by combining the individual images such that it appears as though it was captured from a single point on the display, rather than through the use of an actual image capture device located within the perimeter of the display.

Step 24 involves displaying the composite image obtained in step 22 on the local display or a remotely located display. Projecting the composite image from step 22 onto the local display may be helpful in situations where the operator wishes to preview their own image, such as during video messaging, creating video postcards, multimedia training, and multimedia authoring. Projecting the composite image from step 22 onto a remotely located display may be helpful in situations where the operator wishes to transmit their image to a person at a remote location, such as during video conferencing and video telephony. In either case, the operator will appear to be looking directly outward from the composite image for simulated face-to-face contact with a viewer. In a preferred embodiment, the composite image should be projected onto the local or remote display such that it appears in the same approximate position as the virtual camera. Co-aligning the composite image and the virtual camera in this fashion provides simulated line-of-sight image capture without causing the operator to remove his or her eyes from the display to look into an image capture device.

The advantages and benefits of performing line-of-sight image capture in computer-based image capture systems in accordance with the present invention will be discussed below within the context of a video conferencing system. It is to be readily understood that the following embodiments are set forth by way of example only and not limitation. The method 16 of the present invention, once again, may find application in any computer-based image capture system where the operator wants to capture his or her own photographic and/or video image. In addition to a video conferencing system, these computer-based image capture systems may include, but are not necessarily limited to, video telephony systems, video messaging systems, video postcard systems, multimedia training systems, and multimedia authoring systems.

Figure 3:
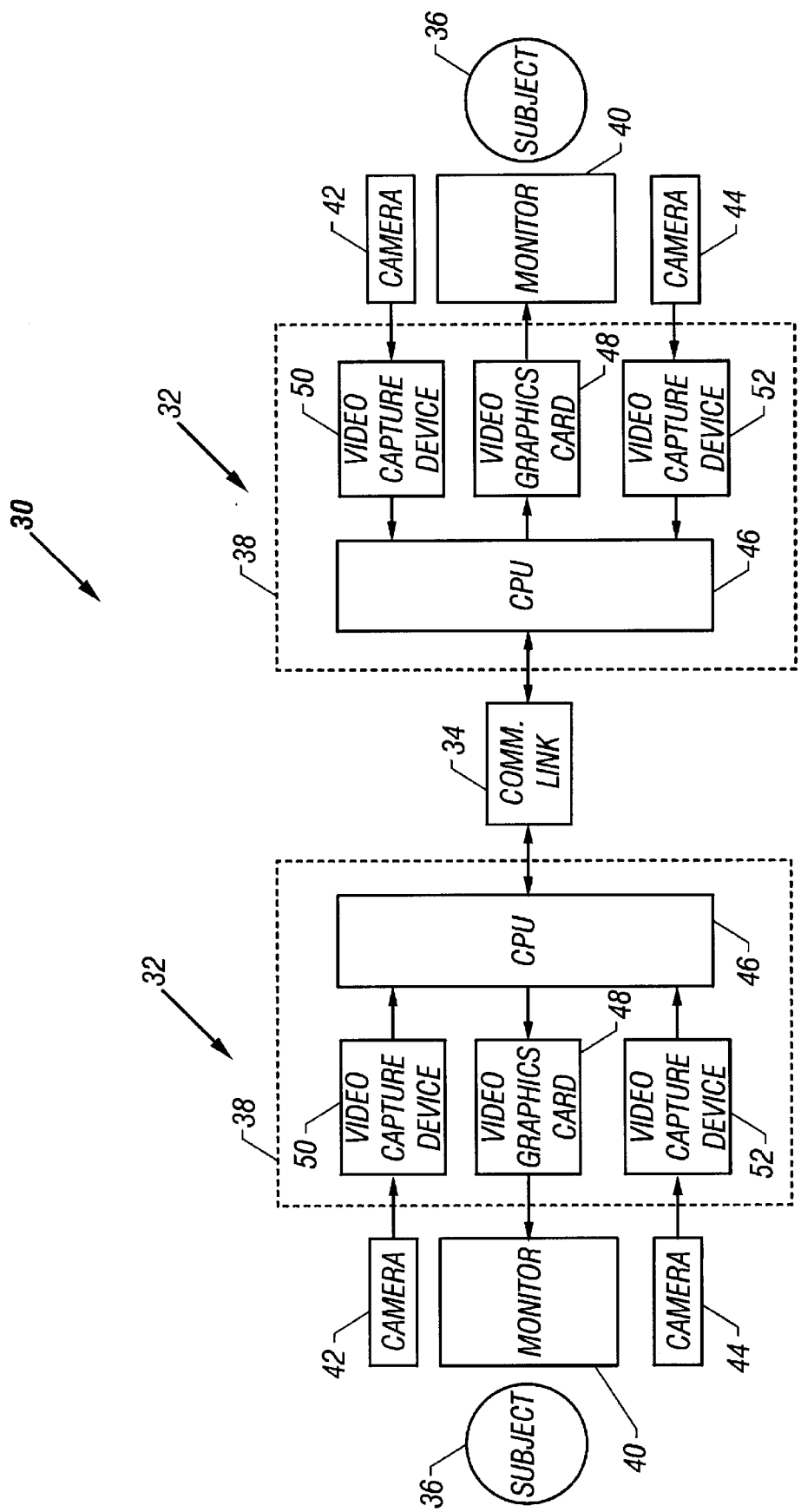
FIG. 3 is a block diagram illustrating the basic functional elements of an improved video conferencing system of the present invention.

With reference to FIG. 3, shown is a block diagram of an improved video conferencing system 30 provided in accordance with the present invention. Broadly stated, the improved video conferencing system 30 includes a plurality of individual video conferencing stations 32 interconnected via a communication link 34 for facilitating the exchange of audio and video information between remote conferencees 36. Each video conferencing station 32 includes a control module 38, a video monitor 40, and at least two video cameras 42, 44. The video cameras 42, 44 are disposed on opposite sides of the video monitor 40 for obtaining video images of the local conferencee 36 from at least two different vantage points.

In one aspect of the present invention, the control module 38 of each video conferencing station 32 seamlessly combines the video images captured by the local video cameras 42, 44 to produce a single composite video image that depicts the local conferencee 36 appearing to look directly into a camera located on the screen of the local video monitor 40 (a "virtual camera"). Thus, when the composite video image produced by the local control module 38 is transferred to the video monitor 40 of a remote video conferencing station 32, the image displayed on the remote video monitor 40 appears to be looking directly at the remote conferencee 36. In this fashion, the conferencees 36 can view their local video monitors 40 while maintaining the outward appearance of looking directly into a camera for effective face-to-face contact between the conferencees 36.

The control module 38 includes a central processing unit (CPU) 46, a video graphics card 48, and one or more video capture devices 50, 52. The CPU 46 manages the overall operation and interaction between the video graphics card 48, the video capture devices 50, 52, the video monitor 40, and the video cameras 42, 44. The video graphics card 48 facilitates the transmission of video information from the CPU 46 to the video monitor 40. The video images obtained by the video cameras 42, 44 are transferred to the local CPU 46 via the video capture devices 50, 52. In one embodiment, application and/or driver code within the CPU 46 is programmed to carry out the operation of seamlessly combining the video images from each video camera 42, 44 to form the single composite video image of the local conferencee 36.

The algorithm employed by the CPU 46 to seamlessly combine the individual images may be based on any of a variety of well known image correlation techniques, such as described in *Digital Image Processing*, 2nd Edition, William K. Pratt (1991), the entire contents of which is incorporated herein by reference. Generally speaking, image correlation involves conducting a pixel-by-pixel comparison of two video images to determine the spatial differences between the images and thereby correct for any perspective view differences between the individual images. By seamlessly combining the individual video images in this fashion, the CPU 46 effectively shifts the point of view of each video camera 42, 44 from the perimeter of the video monitor 40 toward a predetermined location on the display of the local video monitor 40. This inward shifting continues until the point of view of each video camera 42, 44 effectively converges to form a single, virtual point of view at a predetermined position on the display of the local video monitor 40.

This virtual point of view, or virtual camera, is advantageous because it creates the impression that the local conferencee is looking directly into an actual camera. As viewed by a remote conferencee 36, it appears as though the local conferencee 36 is looking directly out of the video monitor 40 for simulated face-to-face contact. By forming the virtual camera on the display of the local video monitor 40, the local conferencee 36 can continuously view the information on their video monitor 40 without having to look at the video cameras 42, 44 to establish eye contact with the remote conferencees 36.

The video conferencing system 30 of the present invention may be constructed from any of a variety of commercially available components. For example, the central processing unit (CPU) 46 may comprise any number of processing units capable of high speed parallel operations, such as the PENTIUM®, PENTIUM PRO®, and other processors based on the MMX technology developed by the Intel Corporation. The video graphics card 48 may similarly comprise any number of different commercially available video graphics cards, but in one embodiment is a device controlled interface (DCI) enabled for stretching the composite video image on the video monitor 40 for the purpose of removing parallax distortions. The video capture devices 50, 52 may comprise any number of off-the-shelf video capture devices capable of converting the analog video images from the video cameras 42, 44 into digital data representative of the analog video images. For example, the video capture devices 50, 52 may include, but are not necessarily limted to, any of a variety of commercially available video cards, such as the ISVR3 video capture card available from Intel Corporation, and any of a variety of commercially available cameras having video capture capability, such as the QuickCam™ and QuickClip™ cameras available from the Connectix Corporation.

Although shown as two discrete components, it is to be readily understood that the video capture devices 50, 52 may be replaced with a single video capture card having two channels. The video monitor 40 may include any number of different off-the-shelf monitors, including but not limited to a standard VGA computer monitor or a NTSC television set. The video cameras 42, 44 may similarly comprise any of a variety of commercially available image capture devices capable of generating video and/or photographic output. The communication link 34 may include any of a variety of communication interfaces that meet Internet and telecommunications industry standards (i.e. H. 320, H. 323, H. 324), such as an ISDN interface to a local telephone carrier or a local area network (LAN) interface card to a local area network. Constructing the improved video conferencing system 30 from off-the-shelf components in this fashion advantageously minimizes production cost.

Figure 4:
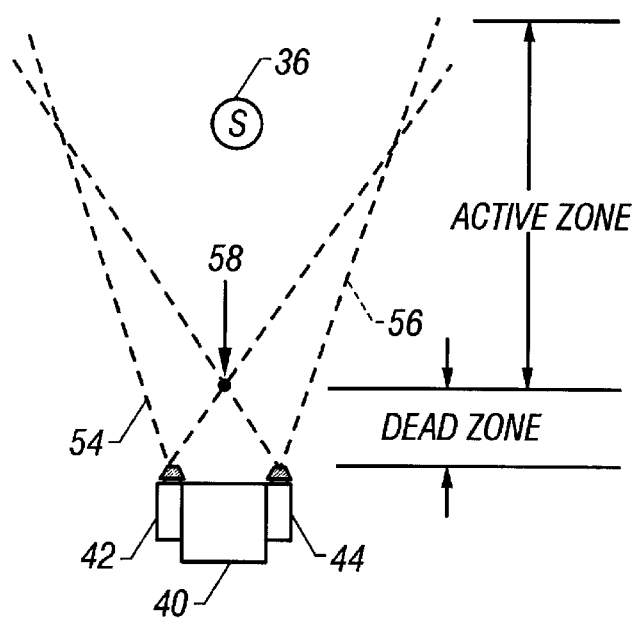
FIG. 4 is an elevational view illustrating the field-of-view for each of a pair of co-aligned video cameras in accordance with the present invention.

The video conferencing system 30 of the present invention is capable of handling both close and long range video conferencing scenarios by providing the ability to selectively modify the aspect ratio of the virtual camera. As shown in FIG. 4, the video cameras 42, 44 of the present invention are disposed on either side of the video monitor 40 such that each field-of-view 54, 56 overlaps before enveloping the conferencee 36. The point where the two fields-of-view 54, 56 intersect is denoted generally at 58. The area located between this intersection point 58 and the video cameras 42, 44 is referred to as the dead zone because the CPU 46 is incapable of producing a composite video image in accordance with the present invention when the conferencee 36 is located in this area. All points past the intersection point 58 are referred to as the active zone. In one aspect of the present invention, the CPU 46 is capable of producing a composite video image for simulated face-to-face contact when the conferencee 36 is located at any point in the active zone. The CPU 46 is therefore capable of generating the virtual camera having any number of aspect ratios depending upon the location of the conferencee 36 or conferencees within the active zone.

In one embodiment, the intersection point 58 is approximately six inches away from the monitor 40. This advantageously allows the video conferencing system 30 of the present invention to provide the virtual camera with an aspect ratio suitable for large portrait capture. The large portrait capture produces a relatively narrow and tall field of view for the resulting virtual camera, which is advantageous in detecting gestural movements on the part of a conferencee disposed in close proximity to the video monitor 40, such as during desktop video conferencing. The present invention also has the ability to provide the virtual camera with an aspect ratio suitable for a large landscape capture. The large landscape capture produces a relatively wide and short field of view for the resulting virtual camera, which is advantageous in viewing the participants of a large or spread out group of conferencees, such as during room-based video conferencing. As will be appreciated, the ability to set arbitrary aspect ratios effectively maximizes the versatility of the video conferencing system 30 in accommodating both portrait and landscape capture.

The video conferencing system 30 of the present invention is also relatively immune to the parallax distortions that plague prior art video conferencing systems. With continued reference to FIG. 4, this immunity to parallax distortions is due to the spaced relation between the video cameras 42, 44. The video cameras 42, 44 are disposed on either side of the video monitor 40 such that video images of the local conferencee 36 may be captured from two separate vantage points. As noted above, the CPU 46 thereafter operates to seamlessly combine the video images from each of the cameras 42, 44 wherein the resulting composite video image depicts the local conferencee 36 looking outwardly for face-to-face contact with the remote conferencee. Due to this image manipulation, the individual video cameras 42, 44 can maintain relatively narrow fields-of-view 54, 56 without jeopardizing the CPU's 46 ability to produce a meaningful composite video image of the local conferencee 36. It is well known that video cameras having narrow projection profiles are capable of obtaining video images that are relatively flat with minimal parallax distortion.

Figure 5:
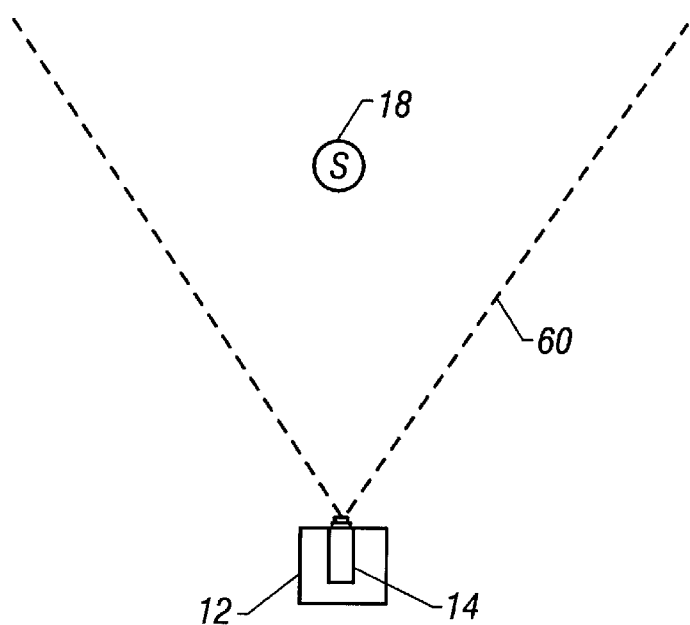
FIG. 5 is an elevational view illustrating the field-of-view of a video camera as employed in prior art video conferencing systems.

In contrast, the prior art video camera 14 shown in FIG. 5 does not combine with any other video source and therefore must rely on its own relatively wide projection profile 60 to encompass the local conferencee 18. Video cameras having wide projection profiles, however, are known to produce video images having rounded or "fish-eye" parallax distortions that oftentimes causes the video images to appear convoluted and unnatural. In light of the foregoing, the narrow fields-of-view 54, 56 employed in the present invention minimize the extent of any parallax distortion, and thus enable the system to produce and display composite video images that are relatively flat and naturalistic in appearance.

Figure 6:
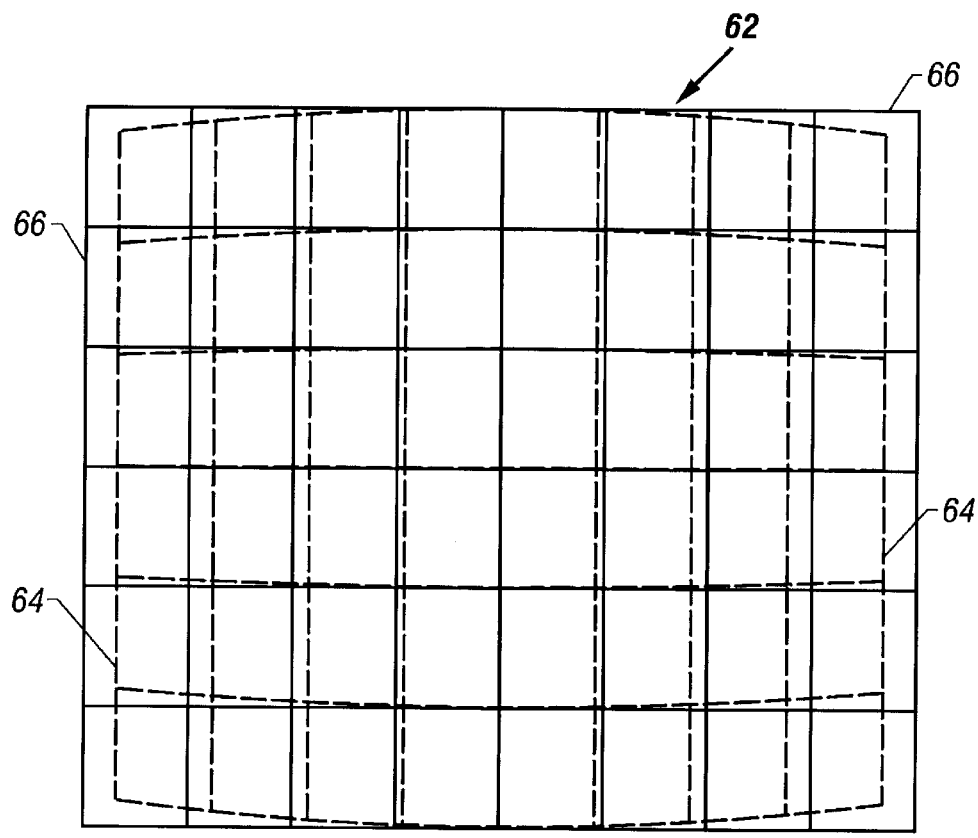
FIG. 6 is a front elevational view illustrating the manner in which a composite video image formed in accordance with the present invention may be stretched from a first state to a second state to remove parallax distortions.

With reference to FIG. 6, the video conferencing system 30 of the present invention also minimizes parallax distortions by implementing a stretching function which makes the composite image 62 appear flatter and more naturalistic. The stretching of the composite image 62 may be performed under the direction of the video graphics card 48 and/or the CPU 46. For purposes of discussion, the stretching function will be explained with reference to the video graphics card 48. The video graphics card 48 may comprise any number of commercially available video graphics cards enabled for device controlled interface (DCI) operation. DCI operation allows the video graphics card 48 to stretch a relatively small pixel count image to a full screen pixel count image. The video graphics card 48 is thus capable of selectively stretching the composite image from an original state (shown in dotted lines at 64) to an expanded state (shown in solid lines at 66). As can be readily recognized, this image-stretching feature further conditions the composite video image 62 of the present invention into a flatter and more natural shape, thereby optimizing the quality of the video communication.

The video conferencing system 30 of the present invention can be implemented in both a room-based conferencing arrangement and a desktop conferencing arrangement. Room-based video conferencing systems include at least two remotely located conferencing stations communicatively linked to one another, wherein each conferencing station is designed to accommodate a plurality of conferencees. A room-based conferencing station of the present invention may include several large dedicated TV monitors, at least two image capture devices, a dedicated CPU, a control box, and a dedicated cabinet to house the components. Desktop video conferencing systems also include at least two remotely located conferencing stations communicatively linked to one another, wherein each conferencing station is designed to accommodate a limited number (1 or 2) conferencees. A desktop conferencing station of the present invention may include a standard computer monitor, at least two image capture devices, and a computer or processor unit for coordinating the transmission and receipt of audio and visual information to and from the various conferencing stations.

For purposes of discussion, the improved video conferencing system 30 of the present invention will be described with reference to the various desktop video conferencing stations shown in FIGS. 7–14. The components common to each desktop video conferencing station include a personal computer 72, a VGA computer monitor 74, and at least one pair of video cameras 76, 78 disposed about the periphery of the video monitor 74. The personal computer 72 may comprise any of a variety of commercially available personal computing systems, but should be equipped with a video conferencing hardware and software system for personal computers, such as the PROSHARE® system manufactured by Intel Corporation. The hardware within the PROSHARE® system includes the communication link 34, the CPU 46, the video graphics card 48, and the video capture devices 50, 52 described above with reference to FIG. 2. The software within the PROSHARE® system coordinates the interactivity of the video conferencing, as well as the process of seamlessly combining video images to produce a composite video image of the local conferencee. The video monitor 74 shown in FIGS. 7, 10, and 13 may include any number of commercially available computer monitors, while the video monitors 74 shown in FIGS. 8–9, 11–12, and 14 comprise computer monitors specifically designed to house the various video cameras 76, 78, 82, 84 along the periphery of the monitor 74. The video cameras 76, 78, 82, 84 may comprise any number of commercially available cameras capable of generating a video output.

Figure 7:
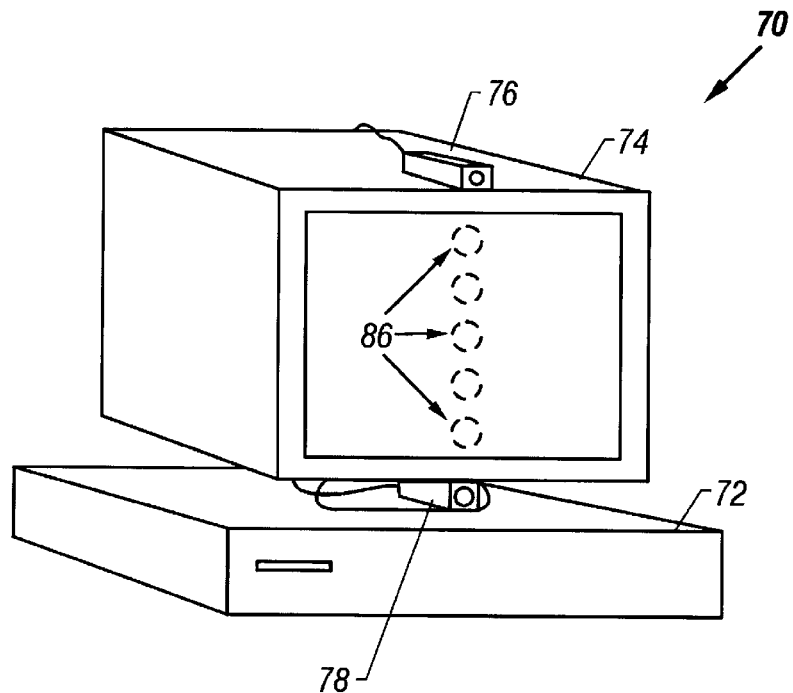
FIG. 7 is a perspective view of a video conferencing station of a first embodiment of the present invention.
Figure 8:
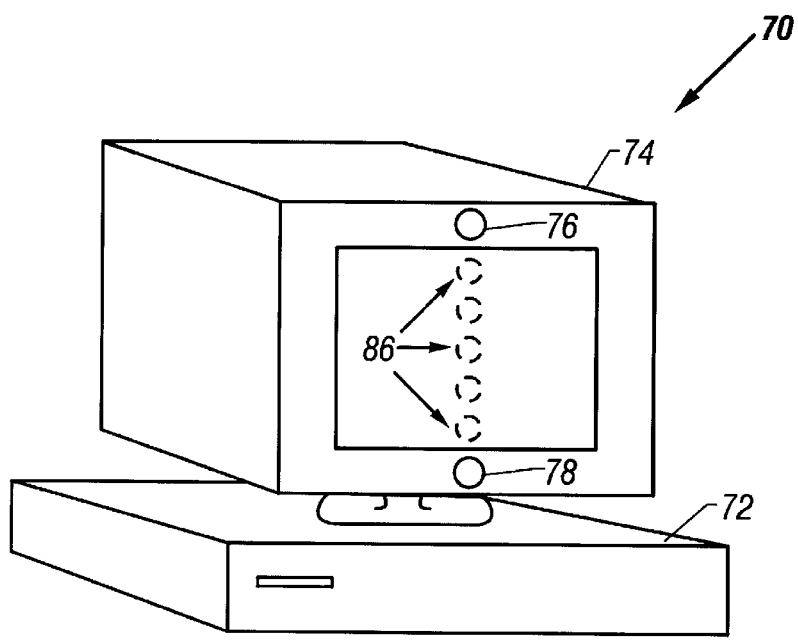
FIG. 8 is a perspective view of a video conferencing station of a second embodiment of the present invention.
Figure 9:
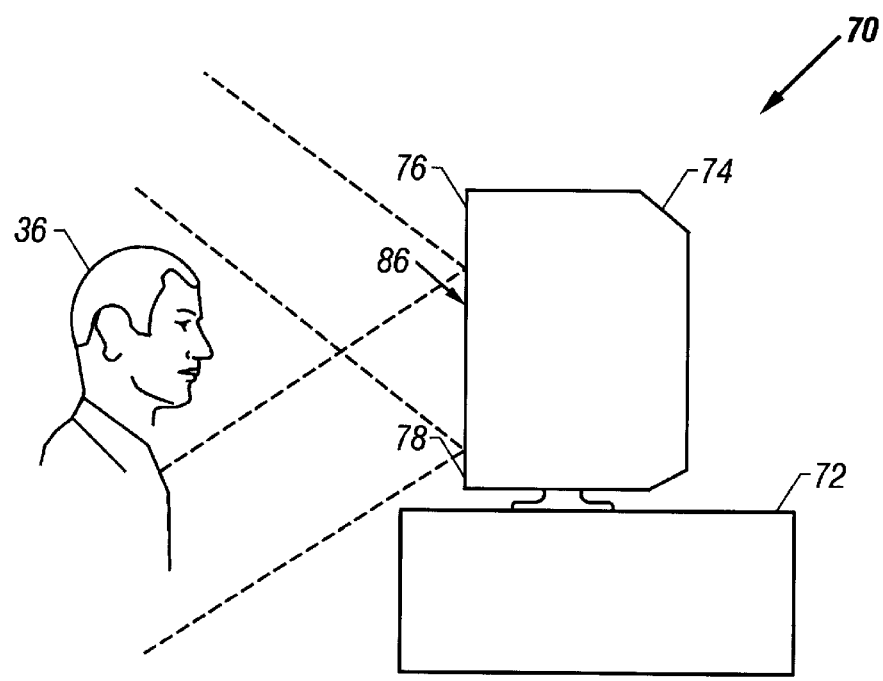
FIG. 9 is a side view of the video conferencing station shown in FIG. 8.

With reference to FIGS. 7–9, the video cameras 76, 78 are disposed in a generally vertically co-aligned fashion about the periphery of the display screen of the video monitor 74. The CPU (not shown) is capable of forming a composite video image depicting a local conferencee (not shown) looking directly into a camera by seamlessly combining the individual video images obtained by the vertically co-aligned video cameras 76, 78. The formation of the composite video image causes the point of view of each video camera 76, 78 to effectively shift inward from its location along the upper and lower periphery of the video monitor 74 toward a predetermined location between the video cameras 76, 78. This inward shifting continues until the point of view of each video camera 76, 78 converges together to form a virtual camera at the predetermined location on the display screen, as shown at 86.

Figure 10:
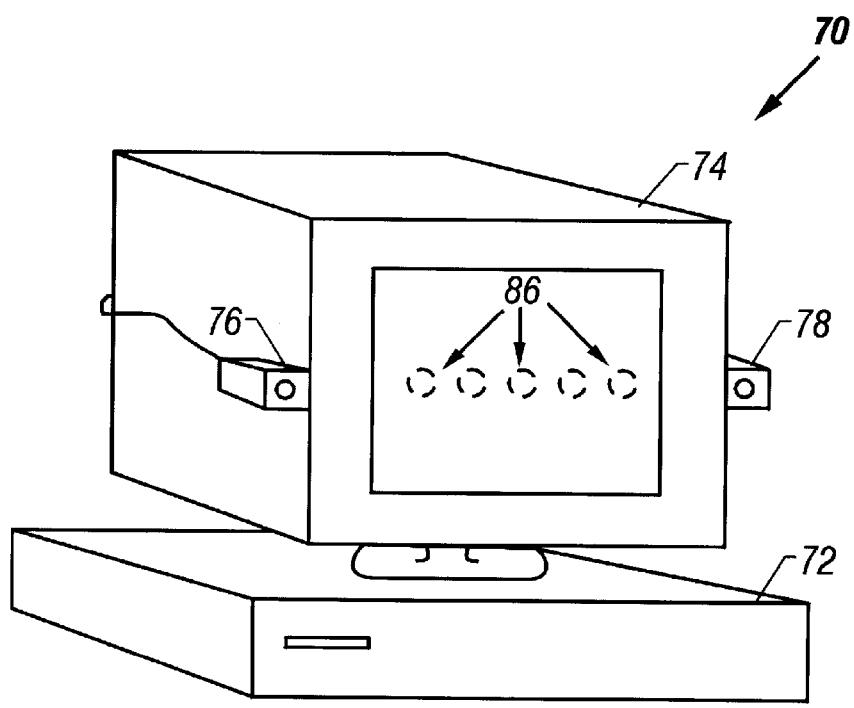
FIG. 10 is a perspective view of a video conferencing station of a third embodiment of the present invention.
Figure 11:
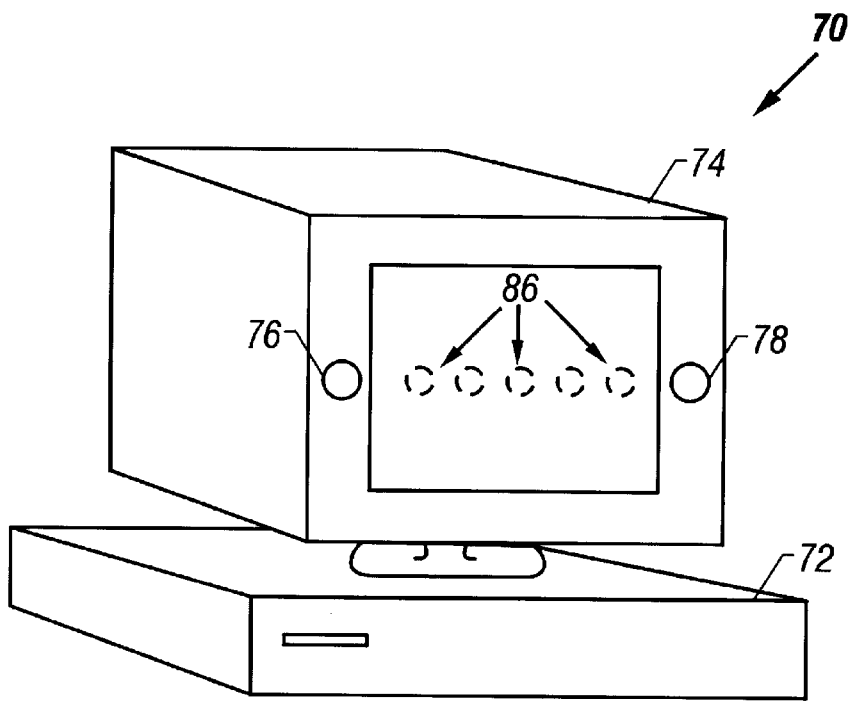
FIG. 11 is a perspective view of a video conferencing station of a fourth embodiment of the present invention.
Figure 12:
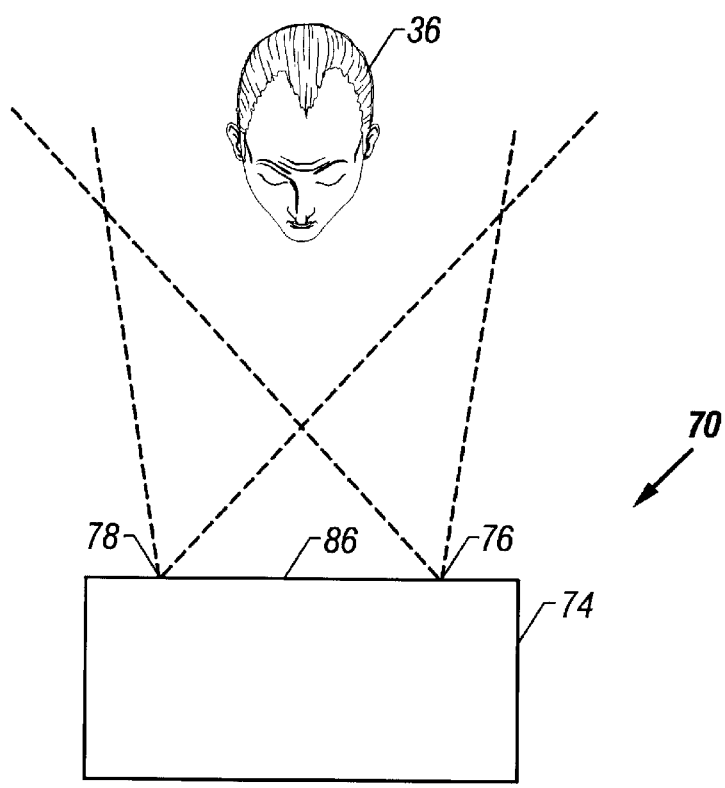
FIG. 12 is a top view of the video conferencing station shown in FIG. 11.

With reference to FIGS. 10–12, the video cameras 76, 78 are disposed in a horizontally co-aligned fashion about the periphery of the display screen of the video monitor 74. The CPU (not shown) is capable of seamlessly combining the individual video images obtained by the horizontally disposed video cameras 76, 78 to once again form a composite video image depicting a local conferencee (not shown) looking directly into a camera for simulated line-of-sight image capture. The formation of the composite video image causes the point of view of each video camera 76, 78 to effectively shift inward from its location along a respective side of the video monitor 74 toward a predetermined location between the video cameras 76, 78. The shifting continues until the point of view of each video camera 76, 78 converges together to form a virtual camera at the predetermined location on the display screen, as at 86.

Figure 13:
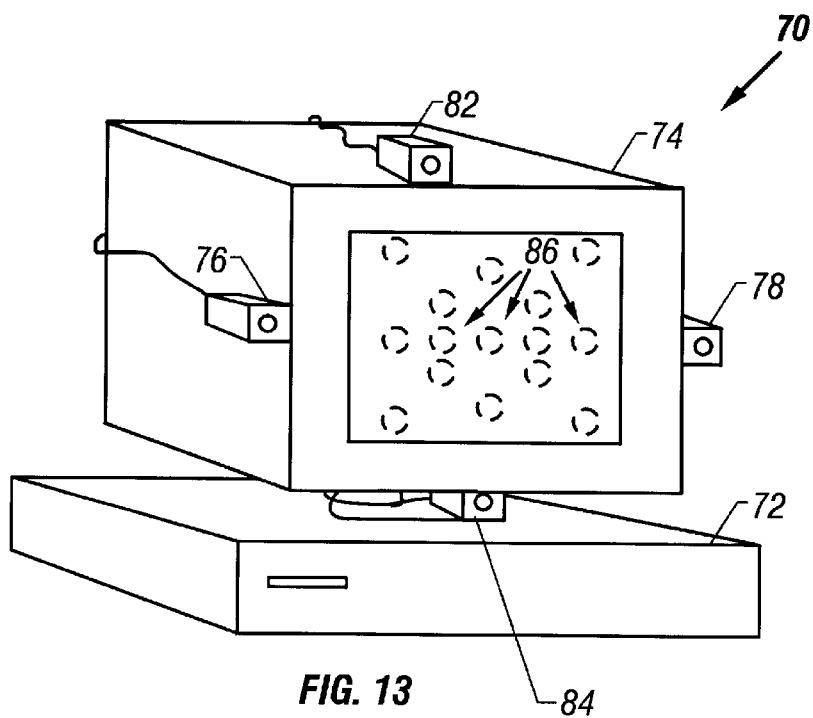
FIG. 13 is a perspective view of a video conferencing station of a fifth embodiment of the present invention.
Figure 14:
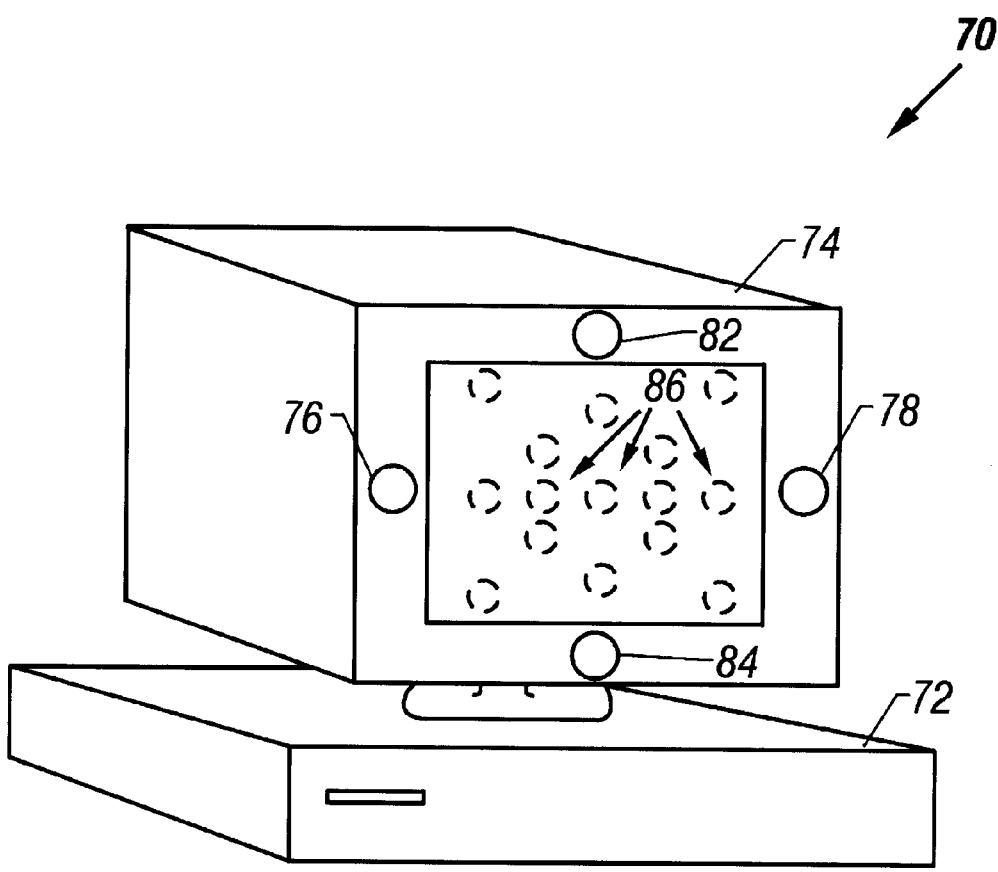
FIG. 14 is a perspective view of a video conferencing station of a sixth embodiment of the present invention.

With reference to FIGS. 13 and 14, the first pair of video cameras 76, 78 is generally horizontally co-aligned about either side of the video monitor 74 and a second pair of video cameras 82, 84 is provided in a generally vertically co-aligned fashion about the upper and lower periphery of the video monitor 74. In this embodiment, the CPU (not shown) is capable of seamlessly combining the individual video images obtained by the video cameras 76, 78, 82, 84 to form a composite video image depicting a local conferencee (not shown) looking directly into a camera. The formation of the composite video image causes the point of view of each video camera 76, 78, 82, 84 to effectively shift inward from its location along a respective side of the video monitor 74 toward a predetermined location between the video cameras 76, 78, 82, 84. The shifting continues until the point of view of each video camera 76, 78, 82, 84 converges together to form a virtual camera at the predetermined location on the display screen, as at 86.

In one aspect of the present invention, the composite video image created in each of the foregoing embodiments of the video conferencing system 30 should be formed such that the resulting virtual camera 86 is generally co-aligned with the displayed image of the remote conferencee 36. In this fashion, the local conferencee 36 will appear to be looking directly into the virtual camera 86, which, in turn, results in simulated face-to-face contact between the conferencees 36 for improved interpersonal communication.

The improved video conferencing system 30 of the present invention overcomes various deficiencies found in prior art video conferencing systems. The video conferencing system 30 provides improved face-to-face contact between conferencees by providing a virtual camera for simulated line-of-sight image capture. The conferencing system 30 accomplishes this without reconfiguring the video conferencing stations with additional optical components for modifying the transmission and/or display of remote video images. The conferencing system 30 provides the ability to vary the aspect ratio of the video cameras employed in each video conferencing station, thereby allowing the video conferencing system 30 to adapt to a change in the position of the local conferencee without causing distorted and unnatural appearing video images when the local conferencee moves outside the preferred aspect ratio supported by the video camera. The video conferencing system 30 also advantageously reduces the degree of parallax or "fish-eye" distortions when the local conferencee is disposed relatively close to the monitor, thereby providing a more naturalistic image of the conferencees for improved interpersonal communication.

It is to be readily understood that the foregoing video conferencing embodiments shown in FIGS. 3–14 are set forth by way of illustration only and are not to be deemed exhaustive as to the scope of the present invention. The virtual camera technique of the present invention may find use in any number of computer-based image capture applications where line-of-sight image capture is desired, including but not limited to video conferencing, video postcards, video messaging, multimedia training, and multimedia authoring. As used herein, the term "computer-based" is to be construed broadly as including any of a variety of microprocessor-based systems regardless of the physical housing or structure. For example, a computer-based image capture system of the present invention may take the form of a kiosk having an internally disposed processing unit, a display, and at least two image capture devices for capturing images of an operator from at least two offset locations. It is furthermore to be understood that the image capture devices employed as part of the present invention may comprise any number of image capture devices capable of obtaining photographic and/or video images.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover all modifications, equivalents, and alternative falling within the spirit and scope of the invention as defined by the appended claims.

What is claimed is:

1. An apparatus, comprising:
   a display device to display information;
   first and second image capture devices disposed proximate to said display device to capture first and second images of a person within a field of view from a first and a second offset location; and
   a control to select an aspect ratio from a portrait aspect ratio and a landscape aspect ratio, to process the first and second images as data for imaging to form a virtual camera at a predetermined location on said display device for simulated line-of-sight capture of said person in the field of view at said selected aspect ratio and further to implement a stretching function on the simulated line-of-sight capture of said person.

2. The apparatus as set forth in claim 1, wherein said first image capture device is to capture images at a first position offset from said person, and said second image capture device is to capture images at a second position offset from said person.

3. The apparatus as set forth in claim 2, wherein said first image capture device is disposed proximate to a top portion of said display device, and said second image capture device is disposed proximate to a bottom portion of said display device.

4. The apparatus as set forth in claim 2, wherein said first image capture device is disposed proximate to a first lateral side of said display device, and said second image capture device is disposed proximate to a second lateral side of said display device.

5. A computer system for use in simulating image capture, comprising:
   a display to display information;
   at least two cameras disposed proximate to said display, said cameras for capturing images of a person within a field of view from different offset locations; and
   a processor coupled to said cameras for processing said images as data and combining said images to form a composite image having an aspect ratio selected from a portrait aspect ratio and a landscape aspect ratio, and to implement a stretching function on the composite image.

6. The computer system as set forth in claim 5, wherein said cameras includes a first camera and a second camera, said first camera to capture images at a first position offset from said person, and said second camera to capture images at a second position offset from said person.

7. The computer system as set forth in claim 6, wherein said first camera is disposed proximate to a top portion of said display and said second camera is disposed proximate to a bottom portion of said display.

8. The computer system as set forth in claim 6, wherein said first camera is disposed proximate to a first lateral side of said display, and said second camera is disposed proximate to a second lateral side of said display.

9. The computer system as set forth in claim 8, wherein said cameras further include a third camera and a fourth camera, said third camera to capture images at a third position offset from said person, and said fourth camera to capture images at a fourth position offset from said person, wherein said third camera is disposed proximate to a top portion of said display, said fourth camera is disposed proximate to a bottom portion of said display, said processor combining the first, second, third, and fourth images to form said composite image.

10. A method of simulating image capture within a computer-based image capture system, comprising:
    selecting an aspect ratio for a composite image from a portrait aspect ratio and a landscape aspect ratio;
    capturing a first image of an object from a first predetermined location;
    capturing a second image of said object from a second predetermined location offset from said first predetermined location; and
    processing said first and second images of said object as imaged data to form a composite image having said selected aspect ratio and depicting said object looking directly into a lens of a camera, and to implement a stretching function on the composite image.

11. The method set forth in claim 10 further comprising displaying said composite image on a display.

12. The method set forth in claim 10 further comprising transmitting said composite image for display at a remote location.

13. A conferencing station comprising:
    a display to view a first conferee at another location;
    two cameras disposed proximate to said display at different offset locations to capture images of a second conferee within a field of view from said different offset locations of said cameras; and
    a processor coupled to receive image data from said cameras to process images and combine said images to form a composite image of the second conferee looking substantially directly into a lens of a camera when viewed by the first conferee, and to implement a stretching function on the composite image, wherein the composite image has an aspect ratio selected from a portrait aspect ratio and a landscape aspect ratio available in the conferencing station.

14. The conferencing station as set forth in claim 13, wherein said two cameras comprise a first camera and a second camera, said first and second cameras being disposed on opposite sides of the display from each other.

15. The conferencing station as set forth in claim 14, wherein said first camera is disposed proximate to a top portion of said display, and said second camera is disposed proximate to a bottom portion of said display.

16. The conferencing station as set forth in claim 14, wherein said two cameras comprise a third camera and a fourth camera, said third and fourth cameras being disposed on opposite sides of the display from each other and offset from the first and second cameras, wherein said processor combines images from the first, second, third, and fourth cameras to form the composite image.

17. The conferencing station as set forth in claim 16, wherein said first camera is disposed proximate to a top portion of said display, said second camera is disposed proximate to a bottom portion of said display, said third camera is disposed proximate to a first lateral side of said display and said fourth camera is disposed proximate to a second lateral side of said display.

18. A method of facilitating face-to-face communication between a first conferee and a second conferee, comprising:

selecting an aspect ratio for a composite image from a portrait aspect ratio and a landscape aspect ratio;

capturing a first image of a first conferee from a first predetermined location;

capturing a second image of the first conferee from a second predetermined location offset from said first predetermined location; and processing said first and second images of the first conferee as imaged data to form a composite image having the selected aspect ratio and depicting the first conferee looking directly into a lens of a camera so as to be appearing to look straight in the eye of the second conferee when viewed by the second conferee and to implement a stretching function on the composite image.

19. The method of claim 18, wherein:

capturing a first image comprises capturing a first image from a first location proximate a top of a display device; and capturing a second image comprises capturing a second image from a second location proximate a bottom of the display device.

* * * * *